(12) United States Patent
Zhang et al.

(10) Patent No.: US 12,549,330 B2
(45) Date of Patent: Feb. 10, 2026

(54) METHOD AND SYSTEM FOR BLOCKCHAIN ACCESS AUTHORITY CONTROL, APPARATUS, PROGRAM AND MEDIUM

(71) Applicant: CHINA ACADEMY OF INFORMATION AND COMMUNICATIONS TECHNOLOGY, Beijing (CN)

(72) Inventors: Yuwen Zhang, Beijing (CN); Yang Liu, Beijing (CN); Cheng Chi, Beijing (CN); Siyu Zhu, Beijing (CN); Juan Tian, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 103 days.

(21) Appl. No.: 18/706,596

(22) PCT Filed: Jun. 6, 2022

(86) PCT No.: PCT/CN2022/097168
§ 371 (c)(1),
(2) Date: May 1, 2024

(87) PCT Pub. No.: WO2023/077794
PCT Pub. Date: May 11, 2023

(65) Prior Publication Data
US 2024/0421973 A1 Dec. 19, 2024

(30) Foreign Application Priority Data
Nov. 4, 2021 (CN) .......................... 202111297101.6

(51) Int. Cl.
H04L 29/06 (2006.01)
H04L 9/06 (2006.01)
H04L 9/40 (2022.01)

(52) U.S. Cl.
CPC ............ *H04L 9/0618* (2013.01); *H04L 63/10* (2013.01)

(58) Field of Classification Search
CPC ..... H04L 9/0618; H04L 63/10; H04L 9/0643; H04L 9/30; H04L 2209/38; H04L 9/0637;
(Continued)

(56) References Cited

U.S. PATENT DOCUMENTS 9,871,874 B2 * 1/2018 Diem .................. G06F 16/9535
9,992,022 B1 * 6/2018 Chapman .............. H04L 9/3236
(Continued)

FOREIGN PATENT DOCUMENTS

CN 110417750 A 11/2019
CN 112954000 A 6/2021
(Continued)

OTHER PUBLICATIONS

International Search Report of PCT/CN2022/097168 mailed Aug. 25, 2022, 2 pages.

*Primary Examiner* — Malcolm Cribbs
(74) *Attorney, Agent, or Firm* — Brooks Kushman P.C.

(57) ABSTRACT

The embodiments of the disclosure disclose a method and a system for blockchain access authority control, an apparatus, a program and a medium. The system comprises a plurality of blockchain nodes. For each blockchain node, a corresponding distributed node is further deployed in a node apparatus where the blockchain node is located, and the distributed nodes form a distributed storage system. A first blockchain node receives an access request sent by a first client, determines a possession of a first authority to access
(Continued)

the blockchain system by the first client according to role confirmation information, and then determines a distributed node where access content is located from the distributed storage system. After determining a possession of a second authority to access the distributed node where the access content is located by the first client according to authority authentication information, the access content is obtained and returned to the first client.

13 Claims, 7 Drawing Sheets

(58) Field of Classification Search
CPC ... H04L 9/3247; H04L 9/3239; H04L 9/3263; H04L 2209/56; H04L 9/0656; H04L 63/102; H04L 63/105; H04L 63/107; G06F 21/62; G06F 21/6209; G06F 21/6218; G06F 21/6227; G06F 21/64; G06F 16/1824; G06F 21/44; G06F 21/629; G06F 16/2379; G06F 16/9027; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | |
|---|---|---|---|
| 2019/0149325 A1* | 5/2019 | Garagiola | H04L 9/3239 380/278 |
| 2019/0273739 A1* | 9/2019 | Pemmaraju | H04L 63/145 |
| 2020/0159946 A1* | 5/2020 | Castinado | H04L 63/08 |
| 2021/0065317 A1 | 3/2021 | Cali et al. | |
| 2021/0124730 A1* | 4/2021 | Kannan | H04L 9/50 |
| 2021/0203503 A1* | 7/2021 | Soundararajan | G06F 21/6218 |
| 2021/0390533 A1* | 12/2021 | Fan | G06Q 20/3825 |
| 2022/0052988 A1* | 2/2022 | Gadnis | H04L 63/0464 |

FOREIGN PATENT DOCUMENTS

| | | |
|---|---|---|
| CN | 113157648 A | 7/2021 |
| CN | 113222595 A | 8/2021 |
| CN | 113742782 A | 12/2021 |

* cited by examiner

ND SYSTEM FOR BLOCKCHAIN
METHOD AND SYSTEM FOR BLOCKCHAIN ACCESS AUTHORITY CONTROL, APPARATUS, PROGRAM AND MEDIUM

This application is the U.S. national phase of PCT Application No. PCT/CN2022/097168 filed on Jun. 6, 2022, which claims priority to Chinese Patent Application No. CN202111297101.6, filed on Nov. 4, 2021, entitled "Method for Blockchain Access Authority Control Based on Privacy Protection and Blockchain System", the disclosures of which are hereby incorporated in their entirety by reference herein.

TECHNICAL FIELD

The disclosure relates to a blockchain technology, and for example relates to a method and a blockchain system for blockchain access authority control based on privacy protection, an electronic apparatus, a computer program, and a computer-readable storage medium.

BACKGROUND

Blockchain technology is a ledger-based technology jointly maintained by multiple parties, which involves a combination of multiple technologies such as consensus mechanisms, cryptographic algorithms, network routing and contract scripts, and for example features distributed trust, tampering resistance and multi-party maintenance. These technical features make the blockchain technology considered as one of the most revolutionary technologies since the popularity of the Internet, and highly valued all over the world.

For example, when accessing contents in a blockchain system, a confirmation is performed with respect to a role of an access object, for example an administrator. After the confirmation with respect to the role passed and the access object has an authority to access the blockchain system, the access object may obtain the accessed data. For example, after the confirmation with respect to the administrator role passed, all data in the blockchain system may be accessed.

BRIEF SUMMARY

For example, for the above technical problems, embodiments of the disclosure disclose a method and a blockchain system for blockchain access authority control based on privacy protection, an electronic apparatus, a computer program, and a computer-readable storage medium.

In an aspect of the disclosure, disclosed is a method for a blockchain access authority control based on privacy protection, which is applied to a blockchain system. The blockchain system comprises a plurality of blockchain nodes, and for each blockchain node of the plurality of blockchain nodes, a distributed node corresponding to the blockchain node is also deployed on a node device where the blockchain node is located, and distributed nodes corresponding respectively to the plurality of blockchain nodes form a distributed storage system. The method comprises:

receiving, by a second blockchain node, a data storage transaction, a first ciphertext and a second ciphertext sent by a second client, wherein the first ciphertext is obtained by encrypting a content to be stored with a first encryption key of the second client, the second ciphertext is obtained by encrypting a first decryption key with a private key of the second client, the second blockchain node is any blockchain node in the blockchain system, and the first decryption key and the first encryption key are same symmetric keys or mutually asymmetric keys;

verifying, by the second blockchain node, the data storage transaction;

determining, by the second blockchain node, a first storage node from the distributed storage system if the data storage transaction passes verification, wherein the first storage node is a distributed node for storing the first ciphertext;

determining, by the second blockchain node, a content identifier corresponding to the first ciphertext, writing the first ciphertext and the content identifier into the first storage node, and writing the data storage transaction into a local blockchain of the second blockchain node;

receiving, by a first blockchain node, an access request sent by a first client, wherein the access request comprises instruction information of an access content, and role confirmation information and authority authentication information of the first client, and the first blockchain node is any blockchain node in the blockchain system;

determining, by the first blockchain node, a distributed node where the access content is located from the distributed storage system based on the indication information, after determining a possession of a first authority to access the blockchain system by the first client according to the role confirmation information; and obtaining, by the first blockchain node, the access content from the distributed node where the access content is located and returning the access content to the first client, after determining a possession of a second authority to access the distributed node where the access content is located by the first client according to the authority authentication information.

In another aspect of the disclosure, disclosed is a blockchain system comprising a plurality of blockchain nodes, wherein for each blockchain node of the plurality of blockchain nodes, a distributed node corresponding to the blockchain node is also deployed on a node device where the blockchain node is located, and distributed nodes corresponding respectively to the plurality of blockchain nodes form a distributed storage system, wherein a first blockchain node in the plurality of blockchain nodes comprises a receiving circuit, a distributed node determining circuit and an access authority control circuit, and the first blockchain node is any blockchain node in the first blockchain system, wherein a second blockchain node is configured: to receive a data storage transaction, a first ciphertext and a second ciphertext sent by a second client, wherein the first ciphertext is obtained by encrypting a content to be stored with a first encryption key of the second client, the second ciphertext is obtained by encrypting a first decryption key with a private key of the second client, the second blockchain node is any blockchain node in the blockchain system, and the first decryption key and the first encryption key are same symmetric keys or mutually asymmetric keys; to verify the data storage transaction; to determine a first storage node from the distributed storage system if the data storage transaction passes verification, wherein the first storage node is a distributed node for storing the first ciphertext; and to determine a content identifier corresponding to the first ciphertext, to write the first ciphertext and the content identifier into the first storage node, and to write the data storage transaction into a local blockchain of the second blockchain node;

wherein the receiving circuit is configured to receive an access request sent by a first client, wherein the access request comprises instruction information of an access content, and role confirmation information and authority authentication information of the first client;

wherein the distributed node determining circuit is configured to determine a distributed node where the access content is located from the distributed storage system based on the indication information after determining a possession of a first authority to access the blockchain system by the first client according to the role confirmation information; and wherein the access authority control circuit is configured to obtain the access content from the distributed node where the access content is located and to return the access content to the first client after determining a possession of a second authority to access the distributed node where the access content is located by the first client according to the authority authentication information.

In another aspect of the disclosure, disclosed is an electronic apparatus comprising one or more processors, a memory, a communication part and a communication bus, wherein the one or more processors, the memory and the communication part communicate with each other through the communication bus; and wherein the memory is configured to store at least one executable instruction which causes the one or more processors to perform operations corresponding to the method for blockchain access authority control based on privacy protection in any embodiment of the disclosure.

In another aspect of the disclosure, disclosed is a computer program comprising computer-readable codes which, when running on an apparatus, cause processors in the apparatus to execute instructions for implementing operations in the method for blockchain access authority control based on privacy protection in any embodiment of the disclosure.

In another aspect of the disclosure, disclosed is a non-temporary computer-readable storage medium storing computer-readable instructions which, when being executed, implement operations of the method for blockchain access authority control based on privacy protection in any embodiment of the disclosure.

In the embodiments of the disclosure, after receiving the access request sent by the first client and determining that the first client has the first authority to access the blockchain system according to the role confirmation information, it is not determined directly whether the first client is able to access the distributed nodes in the distributed storage system under the blockchain system, but instead, the distributed node where the access content is located is determined from the distributed storage system, and then after determining that the first client has the second authority to access the distributed node where the access content is located according to the authority authentication information, the access content is obtained from the distributed node where the access content is located and returned to the first client. Thus, for example, through a double authority confirmation on both first authority and second authority, a flexible control for the content access authority in an off-chain storage scenario is achieved, and on the other hand, a risk of sensitive member data leakage caused by one-time authority authentication in this scenario may be reduced.

The disclosure will be described in further detail with reference to the drawings and embodiments.

BRIEF DESCRIPTION OF THE DRAWINGS

The accompanying drawings, as a part of the specification, illustrate embodiments of the disclosure and explain ideas of the disclosure together with the description.

The disclosure may be more clearly from the following detailed description with reference to the accompanying drawings.

Figure 1:
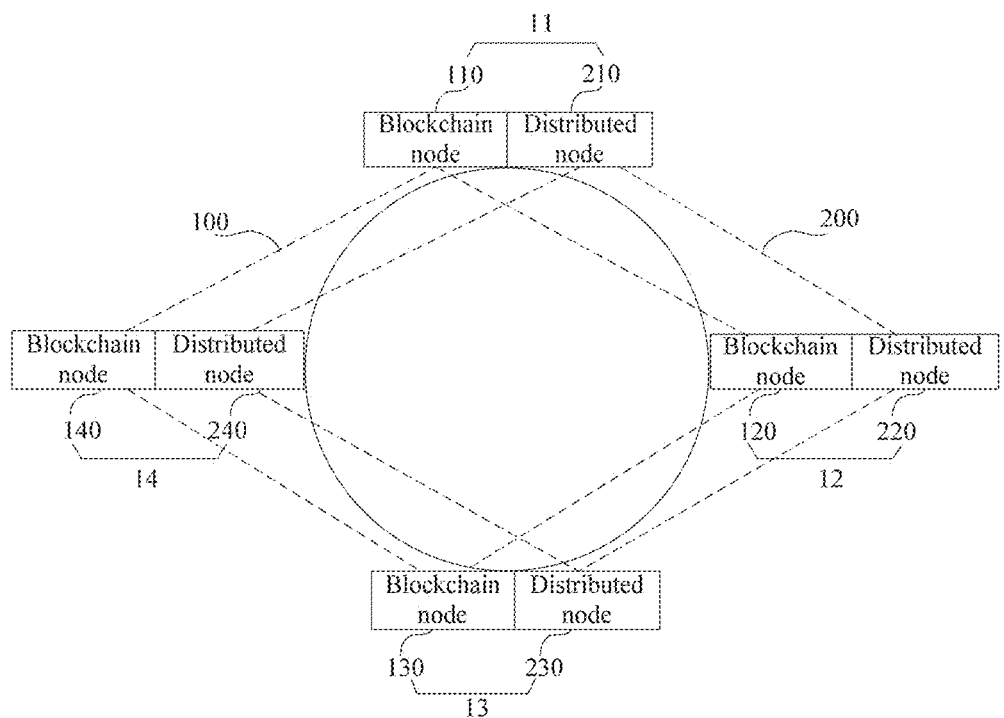
Figure 2:
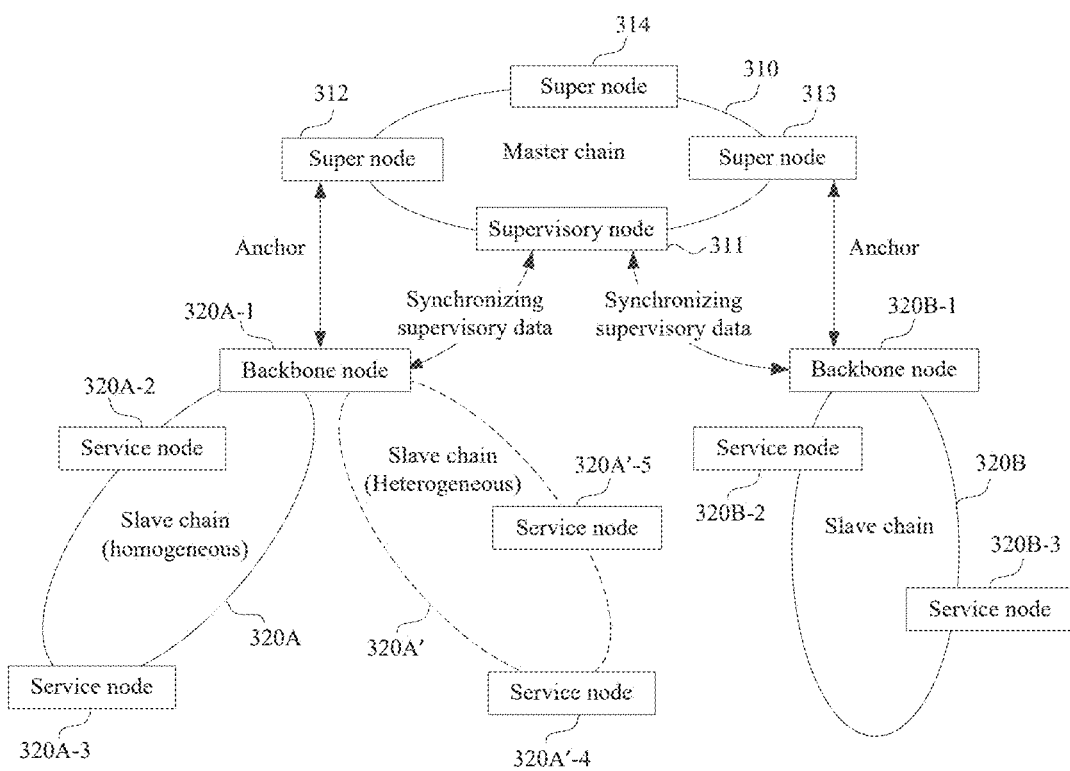
Figure 3:
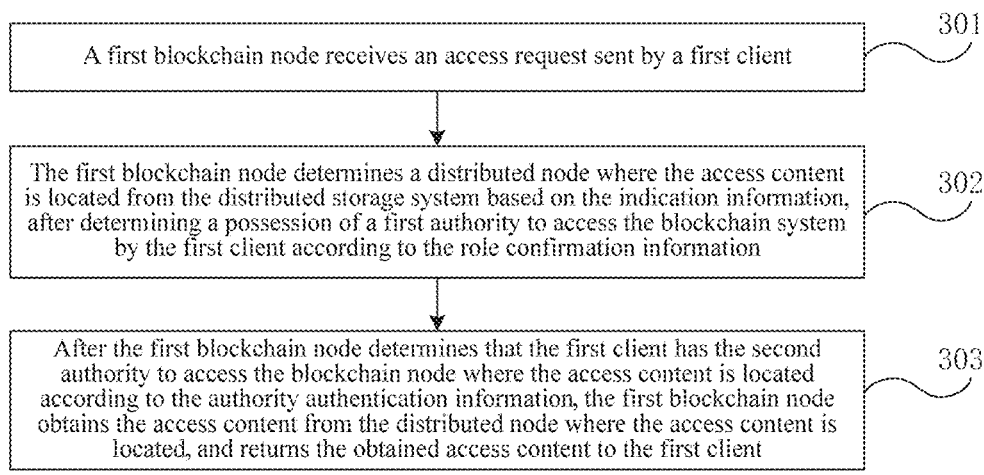
Figure 4:
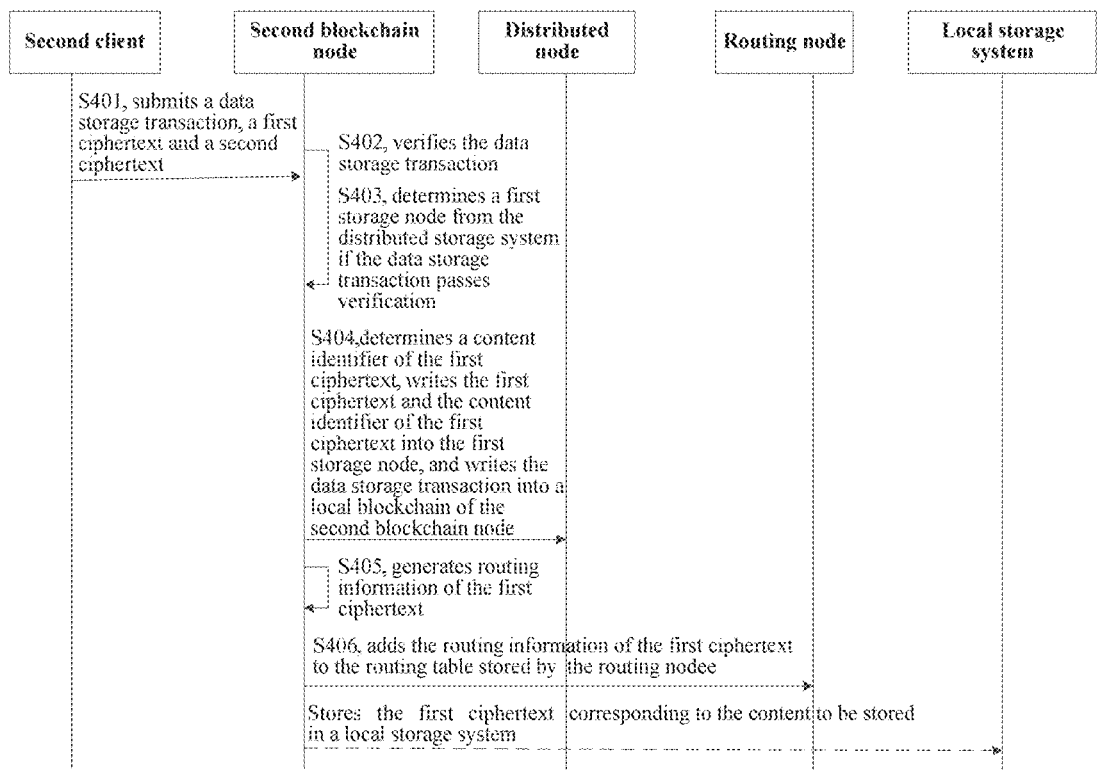
Figure 5:
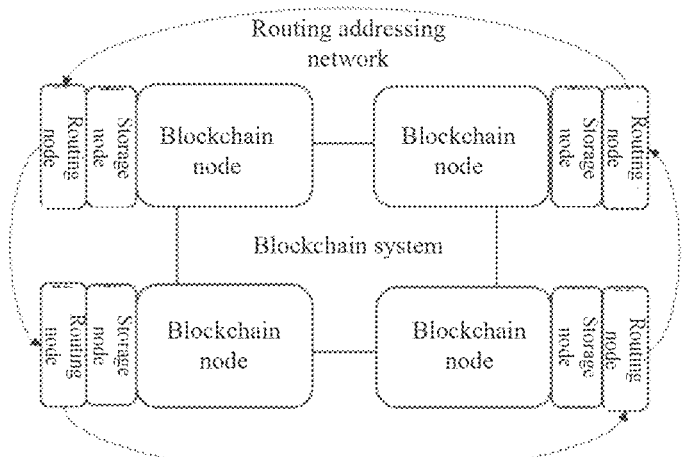
Figure 6:
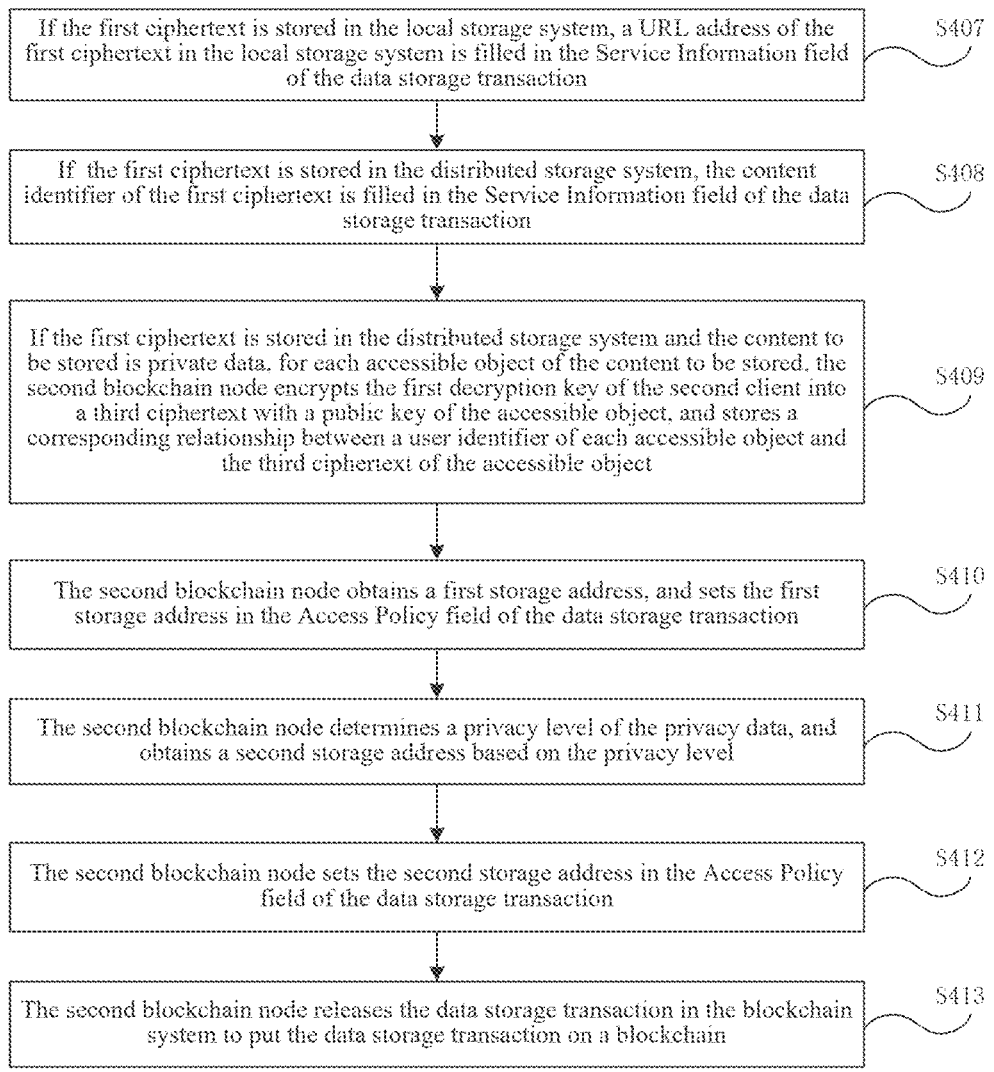
Figure 7:
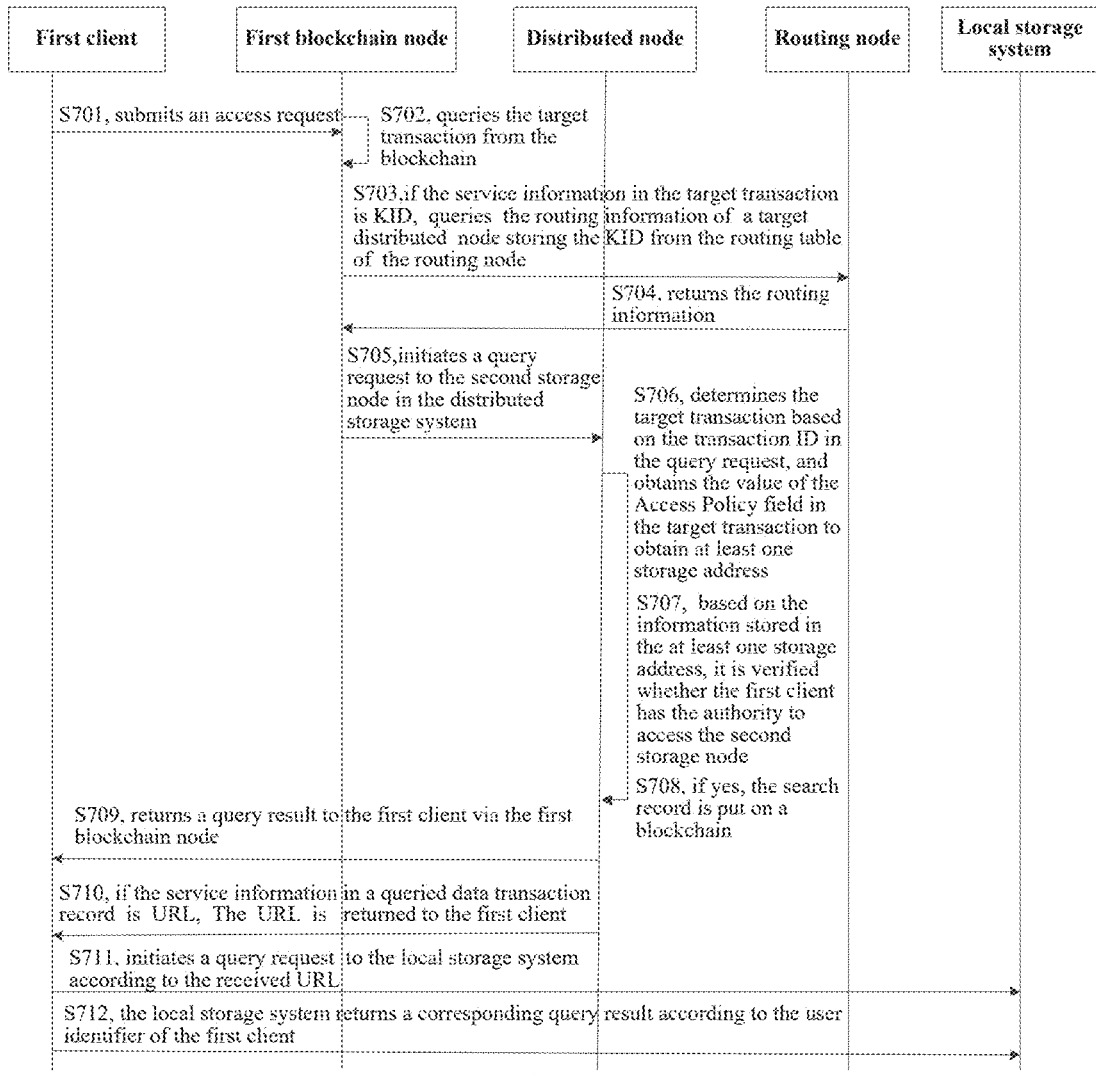
Figure 8:
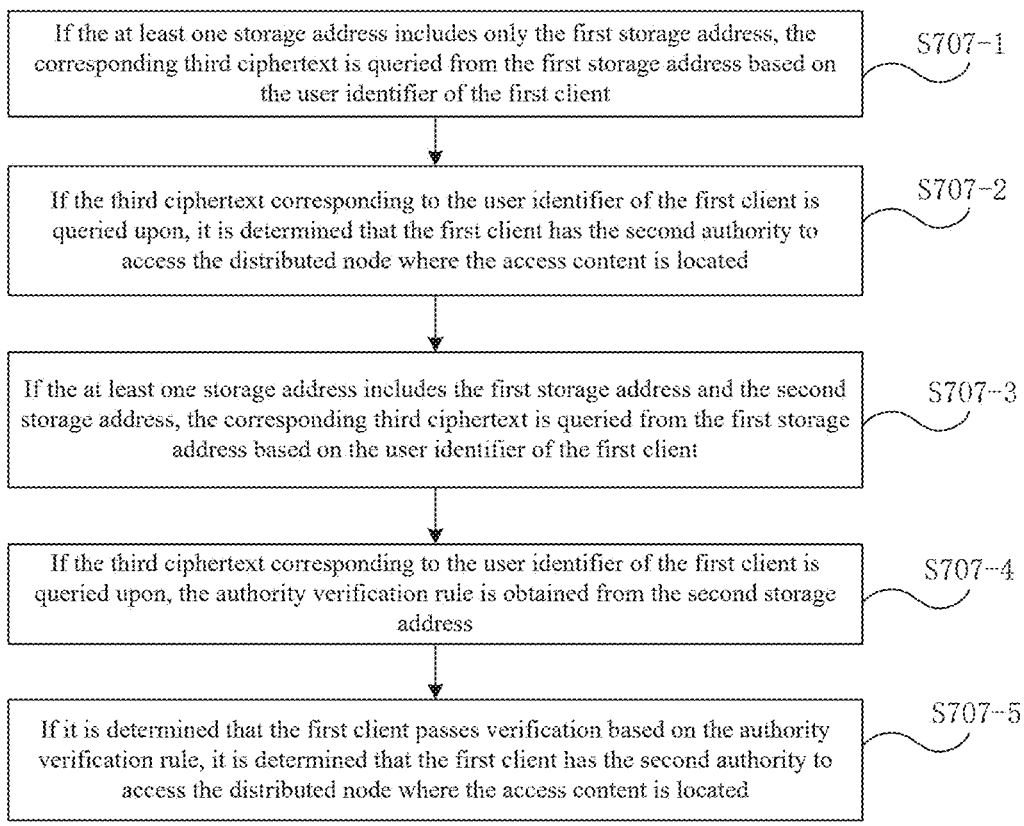
Figure 9:
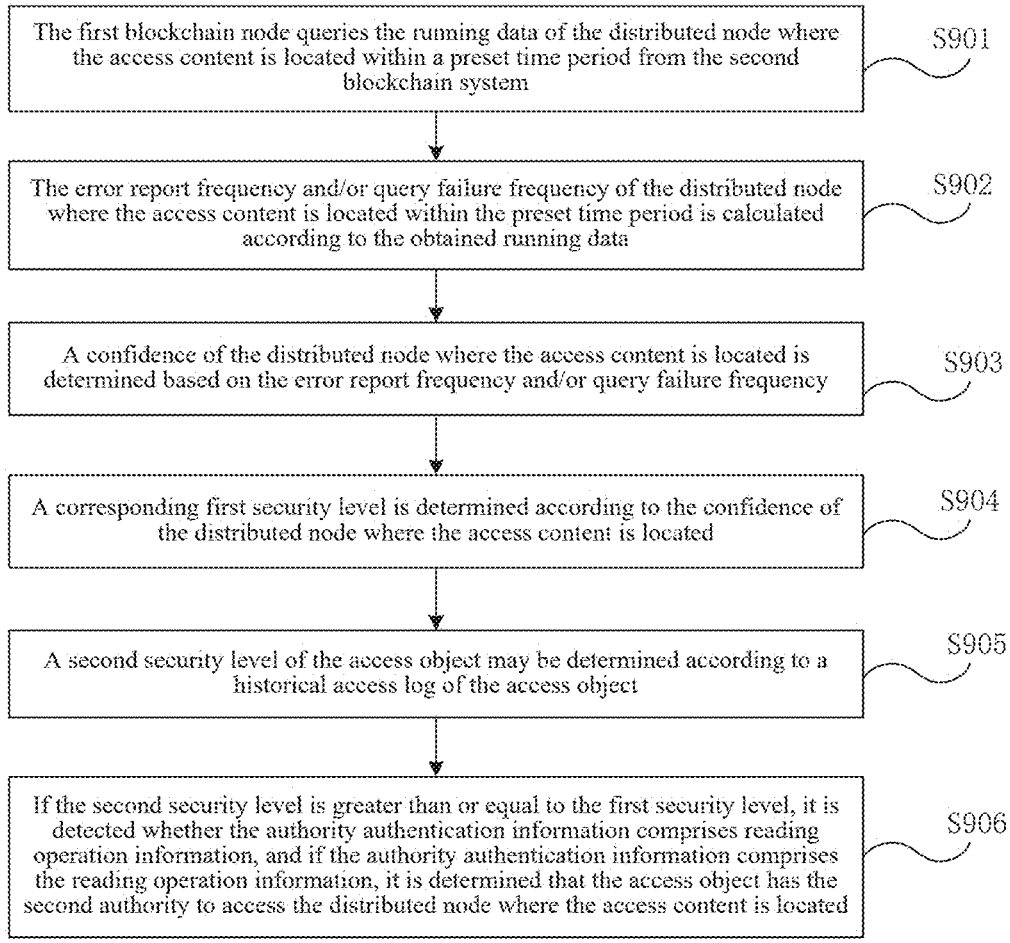
Figure 10:
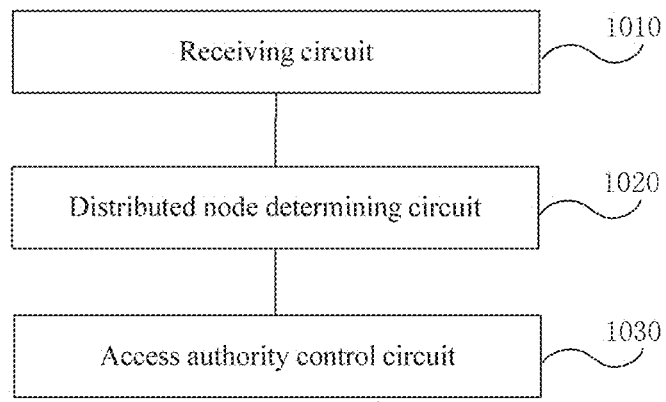
Figure 11:
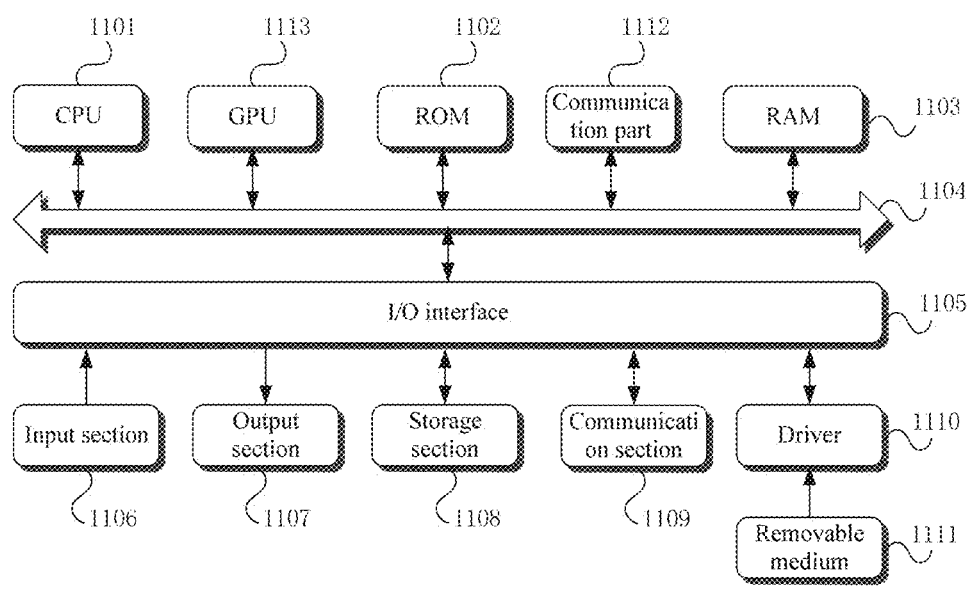

The drawings herein provide a further understanding of the disclosure and form a part of the disclosure. The illustrative embodiments and descriptions of the application are used to explain the disclosure, but do not constitute an improper limitation of the disclosure. In the drawings:

FIG. 1 shows an architectural diagram of a blockchain system and a distributed storage system in an embodiment of the disclosure;

FIG. 2 shows a diagram of a master-slave chain architecture in an embodiment of the disclosure;

FIG. 3 shows a flowchart of a method for blockchain access authority control based on privacy protection in an embodiment of the disclosure;

FIG. 4 shows a flowchart of another method for blockchain access authority control based on privacy protection in an embodiment of the disclosure;

FIG. 5 shows another architectural diagram of a blockchain system and a distributed storage system in an embodiment of the disclosure;

FIG. 6 shows a flowchart of yet another method for blockchain access authority control based on privacy protection in an embodiment of the disclosure;

FIG. 7 shows a flowchart of still another method for blockchain access authority control based on privacy protection in an embodiment of the disclosure;

FIG. 8 shows a diagram of sub-steps of step S707 shown in FIG. 7;

FIG. 9 shows a diagram of sub-steps of step S303 shown in FIG. 3;

FIG. 10 shows a diagram of circuits of a blockchain node in an embodiment of the disclosure; and FIG. 11 is a structural diagram of an electronic apparatus in an embodiment of the disclosure.

DETAILED DESCRIPTION

Various exemplary embodiments of the disclosure will now be described in detail with reference to the accompanying drawings. It is noted that the relative arrangements, numerical expressions and numerical values of components and steps set forth in these embodiments do not limit the scope of the disclosure unless otherwise specified.

It is also understood that in the embodiments of the disclosure, "a plurality of" may refer to two or more, and "at least one" may refer to one, two, or more.

It can be understood by those skilled in the art that terms such as "first" and "second" in the embodiments of this disclosure are only used to distinguish different steps, devices, or circuits, and do not represent any specific technical meaning or their inevitable logical order.

It is also understood that any component, data or structure mentioned in the embodiments of the disclosure can generally be understood as one or more components, data or structures unless explicitly defined or given contrary enlightenment in the context.

It is also understood that the description of various embodiments in this disclosure focuses on the differences among various embodiments, and the same or similar parts may serve as references for each other, and will not be repeated for the sake of brevity.

The description of at least one exemplary embodiment below is only illustrative, and in no way should it be taken as any limitation on the disclosure, its application or uses.

Technologies, methods and apparatuses known to ordinary skilled in the art may not be discussed in detail, but in appropriate cases, they should be regarded as a part of the specification.

It is noted that similar reference numerals and letters indicate similar items in the following figures, so once an item is defined in one figure, it will not be further discussed in the following figures.

In addition, the term "and/or" herein is only an association relationship describing the associated objects, which means that there may be three kinds of relationships, for example, A and/or B may mean A alone, A and B, and B alone. In addition, the character "/" herein generally indicates that the two associated objects are in an "or" relationship.

The embodiments of the disclosure may be applied to electronic apparatuses such as terminal apparatuses, computer systems, servers, and the like, which can be operated together with many other general-purpose or special-purpose computing system environments or configurations. Examples of well-known terminal apparatuses, computing systems, environments and/or configurations suitable for use with terminal apparatuses, computer systems, servers and other electronic apparatuses include, but are not limited to, personal computer systems, server computer systems, thin clients, thick clients, handheld or laptop equipment, microprocessor-based systems, set-top boxes, programmable consumer electronics, network personal computers, small computer systems, mainframe computer systems and distributed cloud computing technology environments including any of the above systems.

Terminal apparatuses, computer systems, servers and other electronic apparatuses can be described in the general context of computer system executable instructions (such as program modules) executed by computer systems. Generally, program modules may include routines, programs, object programs, components, logic, data structures, etc., which perform particular tasks or implement particular abstract data types. Computer systems/servers can be implemented in a distributed cloud computing environment where tasks are performed by remote processing apparatuses linked through a communication network. In the distributed cloud computing environment, program modules may be located on local or remote computing system storage media including storage apparatuses.

An embodiment of the disclosure discloses a method for blockchain access authority control based on privacy protection. For any blockchain node in the blockchain system, after receiving an access request from a first client and determining a possession of a first authority to access the blockchain system by the first client according to role confirmation information of the first client, instead of allowing directly the first client to access data, a distributed node where the access content requested by the first client is located is further determined from a distributed storage system based on indication information of the content to be accessed by the first client, and the access content is obtained from the distributed node where the access content is located, and then returned to the first client, after determining a possession of a second authority to access the distributed node where the access content is located by the first client according to authority authentication information. Through dual confirmation for both the first authority and the second authority, the risk of sensitive member data leakage in an off-chain storage scenario may be reduced.

Refer to FIG. 1, which shows an architectural diagram of a blockchain system 100 and a distributed storage system in an off-chain storage scenario in an embodiment of the disclosure. The blockchain system 100 comprises a plurality of blockchain nodes, such as blockchain nodes 110, 120, 130 and 140. It may be understood that the blockchain nodes shown in FIG. 1 are only schematic, and the blockchain system 100 may also comprise more or less blockchain nodes, which is not limited by the embodiment of the disclosure.

For each blockchain node of the plurality of blockchain nodes included in the blockchain system 100, a distributed node is further deployed in a node apparatus where the blockchain node is located, and the blockchain node and the distributed node deployed in the same node apparatus correspond to each other. It can be understood that the blockchain node may be a combination of hardware resources on the node apparatus and blockchain clients deployed on the node apparatus. The distributed nodes corresponding to respective blockchain nodes in the blockchain system 100 may form a distributed storage system, for example a Distributed Hash Table (DHT) system, which is not limited by the embodiment of the disclosure.

For example, a blockchain node 110 is deployed on a node apparatus 11, and the node apparatus 11 is also provided with a distributed node 210. A blockchain node 120 is deployed on a node apparatus 12, and the node apparatus 12 is also provided with a distributed node 220. A blockchain node 130 is deployed on a node apparatus 13, and the node apparatus 13 may also be provided with a distributed node 230. A blockchain node 140 is deployed on a node apparatus 14, and the node apparatus 14 may also be provided with a distributed node 240. Here, the distributed nodes 210, 220, 230 and 240 may form a distributed storage system. It is noted that a distributed node may be understood as a combination of the hardware resources of the node apparatus where the distributed node is located and a daemon of the distributed node.

Optionally, a smart contract may be deployed on at least one blockchain node in the blockchain system 100. For example, for each blockchain node in the blockchain system 100, a smart contract may be deployed which may communicate with the daemon of the distributed node in the node apparatus where the blockchain node is located. For example, the blockchain node 110 may deploy a smart contract communicating with the daemon of the distributed node 210, the blockchain node 120 may deploy a smart contract communicating with the daemon of the distributed node 220, the blockchain 130 may deploy a smart contract communicating with the daemon of the distributed node 230, and the blockchain 140 may deploy a smart contract communicating with the daemon of the distributed node 240.

Optionally, the blockchain system 100 may communicate as a slave chain system with another blockchain system as a master chain system. For example, the blockchain system 100 comprises a backbone node which may be anchored with a super node in the master chain system.

The master chain system and a plurality of slave chain systems may be of a "1+N" master-slave chain architecture. FIG. 2 shows a diagram of a master-slave chain architecture in an embodiment of the disclosure. For example, in a blockchain system with a master-slave chain architecture comprising a master chain system 310 and slave chain systems 320A, 320A', 320B and 320B' as shown in FIG. 2, any slave chain system may serve as the blockchain system 100 in this embodiment.

It can be understood that the above master chain system may be configured to ensure an efficient operation of a chain group and to promote the healthy development of a whole chain group ecology, for example, to provide public services for a whole chain group structure and facilitate the vigorous development of the chain group ecology; to provide cross-chain trading platforms and specifications for each blockchain to promote data sharing and integration; to provide hosting services for various industries to ensure that data may not be tampered with and may be recovered; to provide trusted authentication to ensure the cross-domain confidence of nodes and data thereof, and allow blockchain nodes with authentication authority to provide authentication services for nodes or identifiers; to provide supervision services and safety monitoring services for each blockchain to ensure the legality and compliance and operational safety of each node in the entire chain group structure; and to make application services of the master chain system open to the outside, so that service nodes may freely enter or exit the master chain system to enjoy the open services provided by the master chain system, so as to promote the improvement of enterprise capabilities.

For example, the master chain system 310 may comprise a plurality of super nodes, for example the super nodes 312, 313 and 314 shown in FIG. 2, and the master chain system 310 may further comprise a supervisory node 311.

In the embodiment of the disclosure, the super node is configured to implement the consensus mechanism of the master chain system, and is also configured to provide a data hosting, a cross-chain gateway, a qualification examination, a chain group management, and so on. The super node provides a trusted computing environment and runs an oracle service based on trusted computing hardware. The super node obtains external data and may provide trusted data services after verification.

Every node in the chain group may apply to be a super node candidate and may be electable as a super node.

The super node constructs a node group, and manages the data synchronization rights for freely accessed service nodes, to improve the overall service capacity of the master chain.

Optionally, the supervisory node may perform a legal and compliant supervision for data and behaviors of users and nodes of the whole chain group, and handle illegal behaviors, for example, by shutting down services, restricting permissions, controlling traffic, and marking untrusted users. Besides, the supervisory node may also conduct a qualification examination and a trusted authentication on the nodes with management authority, such as the super node and the backbone node, to ensure the confidence of key nodes. It is understood that the description of the supervisory node is only an example, and is not used to limit the protection scope of the embodiment of the disclosure.

The master chain system may be configured with basic functions and service functions. For example, the basic functions may include but are not limited to: pluggable architecture, high-performance consensus mechanism, highly reliable smart contract, privacy protection, encryption mechanism, self-governance, homogeneous and heterogeneous chain access and incentive mechanism. For example, the service functions may include but are not limited to: digital identity BID (Blockchain-Based Identifier), trusted authentication service, multi-identifier root zone management, identifier registration and analysis, hosting service, public service, interface service and cross-chain.

In addition to the above basic functions and service functions, the supervisory node may also be configured with functions including but not limited to: data content supervision, node behavior supervision, super node qualification examination, backbone node qualification examination, application violation handling, node violation handling, super node authentication and backbone node authentication.

In addition to the above-mentioned basic functions and service functions, the super node may also be configured with functions including but not limited to: public data management, user/node identity authentication, external public service, node group construction and management, slave chain access authentication, chain group management, contract management, trusted computing environment, big data analysis, operation monitoring, master chain consensus, cross-chain gateway, trusted data service and oracle service based on trusted hardware.

By means of the supervisory node and super node of the master chain system, sharing interactive platforms, monitoring and supervision services, equal cooperation and governance, and ecological construction and operation may be achieved.

In this embodiment, the slave chain system comprises a backbone node and a plurality of service nodes. For example, as shown in FIG. 2, the slave chain system 320A comprises a backbone node 320A-1 and service nodes 320A-2, 320-A-3, and the slave chain system 320B comprises a backbone node 320B-1 and service nodes 320B-2, 320B-3.

In this embodiment, the slave chain system is configured with a basic function for ensuring the efficient operation of the slave chain system under the backbone node, and a service function for providing guarantee for the normal development of business of the slave chain system and the benign development of industrial ecology. For example, according to different business scenarios, the slave chain system supports personalized business activities and also supports an independent implementation of consensus.

There may be two ways to access the slave chain system: one is to create a homogeneous slave chain system based on the master chain system, and the other is to develop, by an existing heterogeneous blockchain system, an interface according to an interface specification of the master chain system, so as to access the master chain system.

The slave chain system needs to submit an application to the master chain system to access and is connected to the master chain system through the backbone node.

The slave chain system may use public services or resources of the whole chain group, and may also deploy personalized applications or smart contracts as required.

The slave chain system may be a basic slave chain system, a regional slave chain system, an industrial slave chain system, or the like, which is not limited by the embodiment of the disclosure.

In an embodiment of the disclosure, the backbone node may be configured with functions such as anchoring the master chain system, executing the consensus of the slave chain system, supervising the slave chain system, deploying smart contracts and the like. As described above, the slave chain system may perform a cross-chain interaction with the master chain system through the backbone node. Slave chain systems may share one backbone node. Alternatively, each slave chain system may comprise a backbone node, so that there may be a one-to-one corresponding relationship between slave chain systems and backbone nodes. For example, as shown in FIG. 2, the slave chain systems 320A and 320A' share the backbone node 320A-1, wherein the slave chain system 320A' comprises a backbone node 320A-1 and service nodes 320A'-4, 320A'-5.

The supervision responsibility is to assign a local supervision department to participate in supervision activities by the supervisory node of the master chain system.

A service node is a blockchain node configured to perform transactions, and the authority of the service node is uniformly distributed and managed by a backbone node. In addition, the slave chain system may also comprise a consensus node, that is, a blockchain node for executing consensus.

An example architecture of the slave chain system is described below.

The slave chain system also has basic functions and service functions. For example, the basic functions may include but are not limited to: pluggable architecture, high-performance consensus mechanism, highly reliable smart contract, privacy protection, encryption mechanism, self-governance, master chain interconnection and incentive mechanism. For example, the service functions may include but are not limited to: digital identity, trusted authentication service, multi-identifier fusion management, identifier registration and analysis, personalized customization service, external service, interface service and cross-chain.

In addition to the above-mentioned basic functions and service functions, the backbone node may also be configured with functions including but not limited to: master chain system anchoring, slave chain system management, node rights management in the slave chain system, slave chain system consensus, external service supply, smart contract customization, pluggable component configuration, and chain group voting.

In addition to the above-mentioned basic functions and service functions, the consensus node may also be configured with functions including but not limited to: smart contract customization, slave chain data synchronization, external service supply, slave chain consensus, business activity execution and chain group voting.

In addition to the above-mentioned basic functions and service functions, the service node may also be configured with functions including but not limited to: chain group voting, slave chain data synchronization, smart contract customization, external public service supply, chain group public service usage, and business activity execution.

By means of the backbone node, consensus node and service node of the slave chain system, business autonomy, independent consensus, service customization and public resource sharing may be achieved.

It is understood that the above description of the master-slave chain architecture is only an example, and is not a limitation on the protection scope of this disclosure.

FIG. 3 shows a flowchart of a method for blockchain access authority control based on privacy protection in an embodiment of the disclosure. Referring to FIGS. 1 and 3, a method for blockchain access authority control, which is applied to the application scenario, as shown in FIG. 1 in the embodiment of this disclosure will be described in detail below in combination with an application scenario shown in FIG. 1. The method for blockchain access authority control may comprise steps as shown in FIG. 3.

In S301, a first blockchain node receives an access request sent by a first client, wherein the access request comprises instruction information of an access content, and role confirmation information and authority authentication information of the first client.

The first blockchain node may be any blockchain node in a blockchain system 100. For example, if the blockchain system 100 is a slave chain system as shown in FIG. 2, the first blockchain node may be for example a backbone node. In this case, the access request may be initially sent by the first client to a target super node, and thus the first blockchain node may receive the access request from the target super node. It can be understood that the first client herein may be an access object. Thus, in an implementation, the receiving, by the first blockchain node, the access request sent by the first client in S301 may be implemented by:

receiving, by the backbone node, the access request received and forwarded by the target super node from the first client.

The first client here may be an application program in a computer terminal of an individual user or a process of an application program, and may also be a blockchain node in another slave chain system. It can be understood that the another slave chain system is a slave chain system different from that to which the backbone node in S301 belongs. In an implementation, when the first client expects to access a blockchain node (e.g., the service node 320A-2 shown in FIG. 2) in a slave chain system (e.g., 320A shown in FIG. 2), the first client may send an access request to a target super node (i.e., the super node 312) anchored by the backbone node 320A-1 of the slave chain system 320A, then the super node 312 forwards the access request to the backbone node 320A-1, and the backbone node 320A-1 may further forward the access request to the service node 320A-2.

Role confirmation information in the access request may be used to confirm the role of the access object, for example a user name, a password, etc.

Authority authentication information in the access request may be used to confirm whether the access object currently has an authority to access a blockchain node where the access content is located (for example, the service node 320A-2 shown in FIG. 2), for example an approval form describing what the access object may do with the data (for example, data reading, data deletion, or both data reading and data deletion).

In an optional example, S301 may be executed by a processor calling corresponding instructions stored in the memory or by a receiving circuit in the first blockchain node.

In S302, the first blockchain node determines a distributed node where the access content is located from the distributed storage system based on the indication information, after determining a possession of a first authority to access the blockchain system by the first client according to the role confirmation information.

The determining, by the first blockchain node, the possession of the first authority to access blockchain system 100 according to the role confirmation information in the received access request may be implemented for example by determining a user identity according to the user name and password. If the user identity of the access object is determined as an administrator, it may be determined that the access object has an authority to access the slave chain system. If the user identity of the access object is determined as a guest, it may be determined that the access object does not have an authority to access the blockchain system 100.

In an embodiment of the disclosure, each blockchain node of the blockchain system 100 stores a distributed ledger (also called "a blockchain copy" or "a local blockchain", that is, a chain connected by blocks), and the distributed ledger comprises a plurality of content identifiers and corresponding relationships between each content identifier and at least one distributed node identifier. Each of the content identifier and distributed node identifier here may be a unique identifier (ID) with the same number of digits generated by the same algorithm.

In an optional example, S302 may be executed by a processor calling corresponding instructions stored in the memory or by a distributed node determining circuit in the first blockchain node.

FIG. 4 shows a flowchart of another method for blockchain access authority control based on privacy protection in an embodiment of the disclosure. As shown in FIG. 4, in an implementation, before the step S301, data may be stored as follows.

In S401, a second client submits a data storage transaction, a first ciphertext and a second ciphertext to a second blockchain node in the blockchain system 100.

Here, the second client may be a client of an ordinary user, which may be a data publisher herein. The first ciphertext is obtained by encrypting a content to be stored with a first encryption key of the second client, and the second ciphertext is obtained by encrypting a first decryption key with a private key of the second client.

The data storage transaction may include a plurality fields such as ID, Description, Access Policy, Service Information, Timestamp, Public Key, and Signature, wherein ID, Description, Service Information, Timestamp, Public Key and Signature are all mandatory fields, and Access Policy is optional. Further, Service Information may include two options, a content identifier (KID) and a Uniform Resource Locator (URL). For example, in a case where the content to be stored is stored in a distributed storage system 200, a hash value of the content to be stored needs to be filled in the KID field in Service Information. In a case where the content to be stored is stored in a local storage, an URL address of the content to be stored in the local storage may be filled in the URL field in Service Information.

ID in the data storage transaction is used to uniquely identify the transaction.

Description in the data storage transaction is description information of the content to be stored, which may also be called meta-information, metadata or meta-description.

As mentioned above, the Service Information in the data storage transaction is an optional field. In a case where the content to be stored is stored in a distributed node of the distributed storage system 200, it is determined based on the privacy of the content to be stored whether to set a value of the Access Policy field. For example, if the content to be stored is public data, the value of the Access Policy field may not be set, that is, the Access Policy field is kept empty. If the content to be stored is partially public data (that is, including private data), an URL address of an access policy corresponding to the content to be stored may be set in the Access Policy field of the data storage transaction. In this way, in a subsequent data access, an URL address of an access policy of the data to be accessed may be obtained through the value of the Access Policy field in the data storage transaction, then the access policy of the data to be accessed may be obtained, and it may be verified based on the access policy whether a current access object has an access authority.

In S402, the second blockchain node verifies the data storage transaction.

The second blockchain node may be any blockchain node in the blockchain system 100. Moreover, the second blockchain node and the first blockchain node may be the same blockchain node, or different blockchain nodes, which is not limited by the embodiment of the disclosure.

In S403, the second blockchain node determines a first storage node from the distributed storage system if the data storage transaction passes verification, wherein the first storage node is a distributed node for storing the first ciphertext.

In S404, the second blockchain node determines a content identifier of the first ciphertext, writes the first ciphertext and the content identifier of the first ciphertext into the first storage node, and writes the data storage transaction into a local blockchain of the second blockchain node.

FIG. 5 shows another architectural diagram of a blockchain system and a distributed storage system in an embodiment of the disclosure. As shown in FIG. 5, for each distributed node, a routing node may be further deployed in the node apparatus where the distributed node is located, and the node apparatus may store a routing mechanism or algorithm, and a routing table, and may also be deployed with a process for executing the routing mechanism or algorithm. Here, the process for executing the routing mechanism or algorithm, the routing table, hardware and software resources for running the process, and resources for storing the routing table may be regarded as a whole, i.e., a routing node. In an embodiment of the disclosure, routing nodes on a plurality of node apparatuses may form a routing addressing network.

In this embodiment, a routing algorithm, such as distributed hash table (DHT), chord, pastry or KAD (Kademlia), may be adopted, and each routing node maintains routing node information according to the corresponding algorithm, and stores corresponding relationships between routing node IDs and IP addresses.

Taking the KAD routing mechanism as an example, for each routing node, N K-buckets are maintained according to binary digits N of a node identifier, each K-bucket records network information on other routing nodes known to the current routing node and with a distance $2^i \sim 2^{i+1}$ from the current routing node, and the network information comprises node IDs (NodeID, NID), IP addresses and User Datagram Protocol (UDP) port numbers. In an embodiment of the disclosure, each K-bucket may record the information on K peer nodes, that is, each routing node may record the network information of K other routing nodes with a distance $2^i \sim 2^{i+}$ from itself.

When storing data in this embodiment, the routing node in the node apparatus where the second blockchain node is located calculates a hash value of the first ciphertext to obtain the KID of the first ciphertext (i.e., the content to be stored in the form of ciphertext, hereinafter referred to as content). An XOR operation is conducted on the KID and NIDs of a plurality of routing nodes maintained by the node, to obtain logical distances between the KID and the plurality of NIDs, K NIDs with a minimum logical distance from the KID are selected, and distributed nodes indicated by the K NIDs with the minimum logical distance are determined as first storage nodes. Then, <content, KID> is written into the determined K first storage nodes with the minimum logical distance, wherein "content" represents the content to be stored, and "KID" represents the hash value of the content. It can be understood that whether the content has been tampered with may be verified subsequently based on the KID, to ensure integrity of the content.

Optionally, referring to FIG. 4 again, after S404, the following steps may be included.

In S405, the second blockchain node generates routing information of the first ciphertext, wherein the routing information comprises the KID of the first ciphertext, and the NID, IP address and UDP port of the first storage node.

In S406, the second blockchain node adds the routing information of the first ciphertext to the routing table stored by the routing node.

For example, the routing information added to the routing table may be <KID, NID, IP address, UDP port number>.

It can be understood that, in some cases, the first ciphertext corresponding to the content to be stored may also be stored in a local storage system.

Optionally, before writing the data storage transaction into the local blockchain of the second blockchain node through S404 in the above embodiment of the disclosure, the method may further comprise: if the content to be stored is stored in a local storage system, setting the Service Information field as the URL address of the content to be stored in the local storage system; and if the content to be stored is stored in a distributed storage system, setting the Service Information field as the content identifier of the content to be stored.

Optionally, the data storage transaction in the above embodiment of the disclosure may comprise an Access Policy field. Accordingly, before writing the data storage transaction into the local blockchain of the second blockchain node through S404 in the above embodiment of the disclosure, the method may further comprise: if the content to be stored is stored in a distributed storage system and the content to be stored is private data, decrypting the second ciphertext with a public key of the second client to obtain the first decryption key; for each accessible object of the content to be stored, encrypting, by the second blockchain node, the first decryption key into a third ciphertext with a public key of the accessible object, and storing a corresponding relationship between a user identifier of the accessible object and the third ciphertext of the accessible object; and obtaining, by the second blockchain node, a first storage address, and setting the first storage address in the Access Policy field of the data storage transaction, the first storage address being a storage address of the corresponding relationship.

Optionally, before writing the data storage transaction into the local blockchain of the second blockchain node through S404 of the above embodiment of the disclosure, the method may further comprise: determining, by the second blockchain node, a privacy level of the privacy data, and obtaining a second storage address based on the privacy level, the second storage address being a storage address of an authority verification rule corresponding to the privacy level; and setting, by the second blockchain node, the second storage address in the Access Policy field of the data storage transaction.

FIG. 6 shows a flowchart of yet another method for blockchain access authority control based on privacy protection in an embodiment of the disclosure. Referring to FIG. 6, before writing the data storage transaction into the local blockchain of the second blockchain node in S404 of the embodiment shown in FIG. 4, the following steps may be included.

In S407, if the first ciphertext is stored in the local storage system, a URL address of the first ciphertext in the local storage system is filled in the Service Information field of the data storage transaction.

In S408, if the first ciphertext is stored in the distributed storage system, the content identifier of the first ciphertext is filled in the Service Information field of the data storage transaction.

Optionally, referring to FIG. 6 again, in a further embodiment of the method for blockchain access authority control based on privacy protection, the method may further comprise the following steps.

In S409, if the first ciphertext is stored in the distributed storage system and the content to be stored is private data, for each accessible object of the content to be stored, the second blockchain node encrypts the first decryption key of the second client into a third ciphertext with a public key of the accessible object, and stores a corresponding relationship between a user identifier of each accessible object and the third ciphertext of the accessible object.

The accessible object herein may be a client designated by the second client and allowed to access the content to be stored in the second client.

Here, the first decryption key is a decryption key corresponding to the first encryption key. In a possible scenario, the first encryption key and the second decryption key are asymmetric keys. In another possible scenario, the first encryption key and the first decryption key are symmetric keys, where the first decryption key and the first encryption key are the same. In an implementation, the first decryption key may be obtained as follows: the second blockchain node decrypts a second ciphertext with a public key of the second client, and determines an obtained plaintext as the first decryption key.

In S410, the second blockchain node obtains a first storage address, and sets the first storage address in the Access Policy field of the data storage transaction, wherein the first storage address is a storage address of the corresponding relationship.

Optionally, referring to FIG. 6 again, in a further embodiment of the method for blockchain access authority control based on privacy protection, the method may further comprise the following steps.

In S411, the second blockchain node determines a privacy level of the privacy data, and obtains a second storage address based on the privacy level, wherein the second storage address is a storage address of an authority verification rule corresponding to the privacy level.

In S412, the second blockchain node sets the second storage address in the Access Policy field of the data storage transaction.

In S413, the second blockchain node releases the data storage transaction in the blockchain system to put the data storage transaction on a blockchain.

Optionally, in the embodiments of the disclosure, the indication information of the access content may comprise metadata of the access content or a transaction ID of a data storage transaction corresponding to the access content. Accordingly, in S302, determining a distributed node where the access content is located from the distributed storage system based on the indication information may comprise: querying a target transaction from a blockchain according to the indication information, wherein the target transaction is a data storage transaction comprising the indication information; if service information in the target transaction is a content ID, querying target routing information from a routing table based on the content ID, wherein the target routing information is routing information comprising the content ID; and determining a distributed node represented by the node ID, IP address and UDP port number in the target routing information as the distributed node where the access content is located.

Optionally, in the embodiments of the disclosure, the distributed node where the access content is located is the second storage node. Accordingly, after S302, the method may further comprise: determining, by the first blockchain node, a possession of a second authority to access the distributed node where the access content is located by the first client according to the authority authentication information. For example, in an implementation, the first blockchain node sends a query request to the second storage node based on the target routing information, wherein the query request carries the transaction ID of the target transaction; when receiving the query request, the second storage node determines the target transaction based on the transaction ID in the query request, and obtains the value of the Access Policy field in the target transaction to obtain at least one storage address; if the at least one storage address includes only the first storage address, the corresponding third ciphertext is queried from the first storage address based on the user identifier of the first client; and if the third ciphertext corresponding to the user identifier of the first client is queried upon, it is determined that the first client has the second authority to access the distributed node where the access content is located.

For example, in another implementation, the determining, by the first blockchain node, a possession of a second authority to access the distributed node where the access content is located by the first client according to the authority authentication information may further comprise: if the at least one storage address includes the first storage address and the second storage address, querying the corresponding third ciphertext from the first storage address based on the user identifier of the first client; if the third ciphertext corresponding to the user identifier of the first client is queried upon, obtaining the authority verification rule from the second storage address; and if it is determined that the first client passes verification based on the authority verification rule, determining that the first client has the second authority to access the distributed node where the access content is located.

FIG. 7 shows a flowchart of still another method for blockchain access authority control based on privacy protection in an embodiment of the disclosure. Refer to FIG. 7, which shows a flow of querying the content to be stored after storing the ciphertext of the content to be stored.

In S701, an ordinary user (for example, the first client) submits an access request through the first client.

The access request may carry the indication information for the access content which the first client needs to access, and the indication information may be, for example, the transaction ID of the data storage transaction corresponding to the access content, or the meta-description (or referred to as metadata or meta-information) of the access content. Based on the transaction ID or meta-description, the corresponding data storage transaction may be queried upon from the blockchain.

In S702, the first blockchain node receives the access request, and queries the target transaction from the blockchain according to the indication information in the access request, wherein the target transaction is a data storage transaction comprising the indication information of the access content.

In S703, if the service information in the target transaction is KID, the first blockchain node queries the routing information of a target distributed node storing the KID from the routing table of the routing node.

In S704, the routing node returns the routing information, wherein the routing information comprises the NID, IP address and UDP port.

In S705, the first blockchain node initiates a query request to the second storage node in the distributed storage system based on the routing information, wherein the query request carries the transaction ID of the target transaction.

Here, the second storage node refers to a distributed node determined based on the routing information.

In S706, when receiving the query request, the second storage node in the distributed storage system determines the target transaction based on the transaction ID in the query request, and obtains the value of the Access Policy field in the target transaction to obtain at least one storage address.

In S707, based on the information stored in the at least one storage address, it is verified whether the first client has the authority to access the second storage node.

FIG. 8 shows a diagram of sub-steps of the step S707 shown in FIG. 7. Referring to FIG. 8, S707 may be implemented by the following steps.

In S707-1, if the at least one storage address includes only the first storage address, the corresponding third ciphertext is queried from the first storage address based on the user identifier of the first client.

In S707-2, if the third ciphertext corresponding to the user identifier of the first client is queried upon, it is determined that the first client has the second authority to access the distributed node where the access content is located.

In S707-3, if the at least one storage address includes the first storage address and the second storage address, the corresponding third ciphertext is queried from the first storage address based on the user identifier of the first client.

In S707-4, if the third ciphertext corresponding to the user identifier of the first client is queried upon, the authority verification rule is obtained from the second storage address.

In S707-5, if it is determined that the first client passes verification based on the authority verification rule, it is determined that the first client has the second authority to access the distributed node where the access content is located (i.e., the second storage node).

In S708, if it is determined that the first client has the authority to access the second storage node, the search record is put on a blockchain.

It can be understood that the user may also initiate other operation requests through the client, for example operation requests such as creation, update, transfer, deletion. The corresponding operation records will be put on a blockchain.

In S709, the second storage node returns a query result to the first client via the first blockchain node.

For example, the query result may be the first ciphertext and the third ciphertext. In this case, the first client may decrypt the third ciphertext with a private key of the first client to obtain the first decryption key, and decrypt the first ciphertext into the content to be stored with the first decryption key.

In S710, if the service information in a queried data transaction record is URL, the URL is returned to the first client.

In S711, the first client initiates a query request to the local storage system according to the received URL.

In S712, the local storage system returns a corresponding query result according to the user identifier of the first client.

It can be understood that S702 to S709 and S710 to S712 may be executed alternatively.

In another implementation, a storage location of the data record in the distributed storage system 200 may be determined in the following ways.

Starting from 0, distributed nodes in the distributed storage system 200 may be numbered sequentially with natural numbers. For example, when the distributed storage system 200 comprises three distributed nodes, the numbers are 0, 1 and 2 in order. As shown in FIG. 1, the numbers of the four distributed nodes may be 0, 1, 2 and 3. In an implementation, the blockchain node may perform hash operation on a value of a field (e.g., ID field) of a data record to be stored, and then obtain a remainder for the number of distributed nodes in the distributed storage system 200 with respect to an obtained hash value, and a distributed node numbered by the obtained remainder is a target storage node. The blockchain node stores the data record to be stored to the target storage node, and then releases a corresponding relationship between the value of the ID field of the data record to be stored and anode ID of the target storage node in the blockchain system 100.

In S303, after the first blockchain node determines that the first client has the second authority to access the blockchain node where the access content is located according to the authority authentication information, the first blockchain node obtains the access content from the distributed node where the access content is located, and returns the obtained access content to the first client.

Optionally, in the embodiment of the disclosure, the blockchain system 100 may interact with another blockchain system. In this case, the blockchain system 100 may be called a first blockchain system, and the another blockchain system communicating with the blockchain system 100 may be called a second blockchain system. The first blockchain system may comprise a plurality of notary nodes, which are also blockchain nodes of the second blockchain system. The plurality of notary nodes forms a notary alliance. In other words, the plurality of notary nodes in the notary alliance are blockchain nodes belonging to both the first blockchain system and the second blockchain system.

Referring to FIG. 1 again, in an implementation, at least one (for example, each) blockchain node in the blockchain system 100 may be deployed with a first smart contract which is configured to communicate with a daemon of a distributed node in the node apparatus where the blockchain node is located, and the daemon of each distributed node is configured to send, in real time, running data to the first smart contract communicating with the node.

For example, in the scenario shown in FIG. 1, the blockchain node 110 is deployed with a first smart contract communicating with the daemon of the distributed node 210. The blockchain node 120 is deployed with a first smart contract communicating with the daemon of the distributed node 220. The blockchain node 130 is deployed with a first smart contract communicating with the daemon of the distributed node 230. The blockchain node 140 is deployed with a first smart contract communicating with the daemon of the distributed node 240.

In an implementation, the first smart contract may also be configured to receive the running data sent by the daemons, and send the running data sent by the daemons to each notary node in the notary alliance in the blockchain system 100, and the notary alliance reaches a consensus and then stores the running data in the second blockchain system.

Optionally, the running data of the daemon of each distributed node may comprise, for example, but are not limited to, at least one of an error report record and a query failure record. The error report record comprises at least the node ID of the distributed node, an error report reason and an error report timestamp. The query failure record comprises at least the node ID of the distributed node, a failure reason and a failure timestamp.

In an optional example, S303 may be executed by a processor calling corresponding instructions stored in the memory or by an access authority control circuit in the first blockchain node.

FIG. 9 shows a diagram of sub-steps of step S303 shown in FIG. 3, based on which, in S303, another implementation of determining that the first client has the second authority (that is, the access policy described above) to access the blockchain node where the access content is located according to the authority authentication information may comprise the sub-steps as shown in FIG. 9.

In S901, the first blockchain node queries the running data of the distributed node where the access content is located within a preset time period from the second blockchain system.

Here, the preset time period may be specified in advance, for example, a preset time length before a time point of receiving the access request, such as one day, one week, half a month or one month, which is not limited by the embodiment of the disclosure.

In S902, the error report frequency and/or query failure frequency of the distributed node where the access content is located within the preset time period is calculated according to the obtained running data.

In an implementation, the first blockchain node may search for the target error report record from the second blockchain system, wherein the target error report record comprises the node ID of the distributed node where the access content is located, a time point indicated by the error report timestamp in the target error report record is within the preset time period, the number of the searched target error records may be determined as a first number, and the error report frequency of the distributed node where the access content is located within the preset time period may be obtained by dividing the first number by a time length of the preset time period (i.e. the preset time length mentioned above).

Similarly, the first blockchain node may search for target query failure record from the second blockchain system, wherein the target query failure record may comprise the node ID of the distributed node where the access content is located, a time point indicated by the failure timestamp in the target query failure record is within the preset time period, the number of the searched target query failure records may be determined as a second number, and the query failure frequency of the distributed node where the access content is located within the preset time period may be obtained by dividing the second number by the preset time length.

In S903, a confidence of the distributed node where the access content is located is determined based on the error report frequency and/or query failure frequency.

In an implementation, a first confidence corresponding to the error report frequency may be obtained according to a preset first corresponding relationship between error report frequencies and confidences; and a second confidence corresponding to the query failure frequency may be obtained according to a preset second corresponding relationship between query failure frequencies and confidences. According to a preset weight, confidence of the distributed node where the access content is located may be obtained by weighted summation of the first confidence and the second confidence. It can be understood that both the first corresponding relationship and the second corresponding relationship may be obtained by pre-testing.

Optionally, the weight of the first confidence is related to the error report reason comprised in each target error report record of the distributed node where the access content is located within the preset time period. The weight of the second confidence is related to the failure reason comprised in each target query failure record of the distributed node where the access content is located within the preset time period.

In S904, a corresponding first security level is determined according to the confidence of the distributed node where the access content is located.

In this embodiment, the first corresponding relationship between different error report frequencies and different first confidences may be recorded in a first correspondence table, and the second corresponding relationship between different query failure frequencies and different second confidences may be recorded in a second correspondence table. In an implementation, the first confidence in the first correspondence table and the second confidence in the second correspondence table are randomly combined to obtain multiple combinations. For each combination, the first confidence and the second confidence in the combination are summed, so that multiple sum values may be obtained. The obtained sum values are sorted by size, and multiple security levels are obtained by using the sorted sum values as data segmentation points. For example, assuming that the number of finally obtained data segmentation points is N (N≥1 and N is an integer), there may be N−1 security levels. In other words, a security level corresponds to a confidence interval formed by two adjacent data segmentation points. Two distributed nodes within the same confidence interval have the same security level.

After S903 is executed, a first interval including the confidence of the distributed node where the access content is located may be determined from the confidence intervals respectively corresponding to the plurality of security levels, and a security level corresponding to the first interval may be determined as a first security level.

In S905, a second security level of the access object may be determined according to a historical access log of the access object.

The blockchain system 100 may also store a historical access log for each access object, the historical access log may comprise an object identifier (such as ID) of the access object and a historical access record of the object identifier within a period of time, and each historical access record may comprise a query content identifier and a query result. When the query result is a query failure, the historical access record may also comprise a query failure record. When the query result is an error, the historical access record may also comprise an error report record.

The first blockchain node obtains the error report record and query failure record of the access object within the preset time period, and further calculates an access error report frequency and query failure frequency of the access object for the blockchain system 100 within the preset time period. According to the above-mentioned first corresponding relationship, a third confidence corresponding to the access error report frequency of the access object for the blockchain system 100 within the preset time period is determined; and according to the second corresponding relationship, a fourth confidence corresponding to the query failure frequency of the access object for the blockchain system 100 within the preset time period is determined. A confidence of the access object may be obtained by a weighted summation of the third confidence and the fourth confidence, then a second interval where the confidence of the access object is located is determined from the confidence intervals corresponding to the plurality of security levels respectively, and a security level corresponding to the second interval is determined as a second security level.

In S906, if the second security level is greater than or equal to the first security level, it is detected whether the authority authentication information comprises reading operation information, and if the authority authentication information comprises the reading operation information, it is determined that the access object has the second authority to access the distributed node where the access content is located.

In an implementation, the first security level and the second security level may be compared after obtaining them respectively. If it is determined that the security level of the access object (i.e., the second security level) is greater than that of the distributed node where the access content is located (i.e., the first security level), the security level of the access object satisfies conditions, and it may be further checked whether the authority authentication information comprises the read operation information. If the access authentication information comprises the read operation information, which means that the access object may read the related content or data of the blockchain system, it may be determined that the access object has the authority to access the distributed node where the access content is located (i.e., the second authority).

Through the above implementations, data security in an off-chain storage scenario may be further improved, and the risk of sensitive member data leakage caused by one-time authority authentication may be reduced.

Optionally, in an implementation, obtaining the access content from the distributed node where the access content is located and returning the access content to the first client in S303 may comprise: obtaining the first ciphertext from the second storage node based on the indication information; and returning the first ciphertext and the second ciphertext to the first client, so that the first client may decrypt the second ciphertext to obtain the first decryption key, and decrypt the first ciphertext into the access content with the first decryption key.

Any method for blockchain access authority control based on privacy protection in the embodiments of the disclosure may be executed by any appropriate apparatus with data processing capability, including but not limited to: terminal apparatuses and servers. Alternatively, any method for blockchain access authority control based on privacy protection in the embodiments of the disclosure may be executed by a processor, where, for example, the processor executes any method for blockchain access authority control based on privacy protection in the embodiments of the disclosure by calling corresponding instructions stored in a memory, which will not be repeated below.

Those ordinary skilled in the art may understand that all or a part of the steps for implementing the above method embodiment may be implemented by hardware related to program instructions, the aforementioned program may be stored in a computer readable storage medium, and the program performs the steps included in the above method embodiment when being executed; and the aforementioned storage media include various media which may store program codes, such as ROM, RAM, magnetic disk or optical disk.

Refer to FIG. 10, which shows a diagram of circuits of a blockchain node in the blockchain system 100. The blockchain node in the embodiment of the disclosure may be configured to implement functions of the blockchain node in the above embodiments of the method for blockchain access authority control based on privacy protection. Taking the first blockchain node described above as an example, the first blockchain node 1000 may comprise a receiving circuit 1010, a distributed node determining circuit 1020, and an access control circuit 1030.

The receiving circuit 1010 is configured to receive an access request sent by a first client, wherein the access request comprises instruction information of an access content, and role confirmation information and authority authentication information of the first client.

The distributed node determining circuit 1020 is configured to determine a distributed node where the access content is located from the distributed storage system based on the indication information, after determining a possession of a first authority to access the blockchain system by the first client according to the role confirmation information.

The access authority control circuit 1030 is configured to obtain the access content from the distributed node where the access content is located and to return the access content to the first client, after determining a possession of a second authority to access the distributed node where the access content is located by the access object according to the authority authentication information.

The circuit architecture of the blockchain system 1000 and its interaction with other blockchain systems may be learned from the description of the corresponding content above, and will not be repeated here.

Optionally, the blockchain system 100 may communicate as a slave chain system with a master chain system, the master chain system comprises a plurality of super nodes, the first blockchain node is a backbone node, and the backbone node is anchored with a target super node in the plurality of super nodes. Thus, the receiving circuit 1010 may receive the access request by receiving the access request received and forwarded by the target super node from the access object.

Optionally, each blockchain node in the blockchain system 100 is deployed with a smart contract, the smart contract is configured to communicating with a daemon of a distributed node in the node apparatus where the blockchain node is located, and the daemon of each distributed node is configured to send running data to the smart contract communicating with the node.

Optionally, the smart contract is also configured to send the running data sent by the daemon to a notary alliance in the first blockchain system, which is stored in the second blockchain system after the notary alliance reaches a consensus, wherein the notary alliance comprises a plurality of notary nodes, and each notary node is a blockchain node in the first blockchain system and a blockchain node in the second blockchain system.

Optionally, the running data of the daemon of each distributed node may comprise, for example, but are not limited to, at least one of an error report record and a query failure record. In this case, the access authority control circuit 1030 may determine that the access object has the second authority to access the distributed node where the access content is located according to the authority authentication information by: querying the running data of the distributed node where the access content is located within a preset time period from the second blockchain system; calculating the error report frequency and/or query failure frequency of the distributed node where the access content is located within the preset time period according to the obtained running data; determining a confidence of the distributed node where the access content is located based on the error report frequency and/or the query failure frequency; determining a corresponding first security level according to the confidence; determining a second security level of the access object according to a role of the access object; if the second security level is greater than or equal to the first security level, detecting whether the authority authentication information comprises reading operation information; and if the authority authentication information comprises the reading operation information, determining that the access object has the second authority to access the distributed node where the access content is located.

It is understood that the implementation details of the above-mentioned circuits in the embodiment are similar to the corresponding method steps described above, so relevant descriptions of the corresponding method steps above may be used as a reference, and will not be repeated here.

Through the above design, the access authority of an access object in an off-chain storage scenario may be effectively controlled, and the risk of data leakage is reduced.

It is understood by those skilled in the art that the embodiments of the disclosure may be provided as methods, systems, or computer program products. Therefore, the disclosure may take the form of a complete hardware embodiment, a complete software embodiment, or an embodiment combining software and hardware aspects. Furthermore, the disclosure may take the form of a computer program product implemented on one or more computer usable storage media (including but not limited to magnetic disk memory, CD-ROM, optical memory, etc.) having computer usable program code embodied therein.

The embodiments of the disclosure also provide electronic apparatus, which comprises one or more processors, a memory, a communication part and a communication bus, wherein the one or more processors, the memory and the communication part communicate with each other through the communication bus, the memory is configured to storing at least one executable instruction, and the executable instruction enables the processors to perform operations corresponding to the method for blockchain access authority control based on privacy protection provided by any embodiment of the disclosure.

The embodiments of the disclosure further disclose a computer program, which comprises computer-readable codes, and when the computer-readable codes run on apparatus, processors in the apparatus execute instructions for implementing respective steps in the method for blockchain access authority control based on privacy protection in any embodiment of the disclosure.

The embodiments of the disclosure further disclose a non-temporary computer-readable storage medium storing computer-readable instructions which, when being executed, implement operations in the method for blockchain access authority control based on privacy protection in any embodiment of the disclosure.

FIG. 11 is a structural diagram of an electronic apparatus according to an embodiment of the disclosure. Refer to FIG. 11 which shows a structural diagram of electronic apparatus suitable for implementing a terminal apparatus or a server according to an embodiment of the disclosure. As shown in FIG. 11, the electronic apparatus comprises one or more processors, a communication part, etc. The one or more processors are, for example, one or more central processing units (CPUs) 1101 and/or one or more image processors (GPUs) 1113, etc. The processors may perform various appropriate actions and processes according to executable instructions stored in a read-only memory (ROM) 1102 or executable instructions loaded into a random-access memory (RAM) 1103 from a storage section 1108. The communication part 1112 may comprise, but is not limited to a network card, which may comprise but is not limited to an InfiniBand (IB) network card. The processors may communicate with the read-only memory 1102 and/or the random-access memory 1103 to execute the executable instructions, connect with the communication part 1112 through a bus 1104, and communicate with other target apparatus through the communication part 1112, so as to implement the operations corresponding to any method for blockchain access authority control based on privacy protection in the embodiments of the disclosure.

In addition, in RAM 1103, various programs and data required for device operation may also be stored. CPU 1101, ROM 1102 and RAM 1103 are connected to each other through the bus 1104. When RAM 1103 is provided, the ROM 1102 is an optional circuit. RAM 1103 stores executable instructions, or writes executable instructions into ROM 1102 during running, and the executable instructions cause the processors 1101 to perform the operations corresponding to the method for blockchain access authority control based on privacy protection described above. An input/output (I/O) interface 1105 is also connected to the bus 1104. The communication part 1112 may be integrally arranged or provided with multiple sub-circuits (for example, multiple IB network cards) and located on a bus link.

The following components are connected to the I/O interface 1105: an input section 1106 comprising a keyboard, a mouse and the like; an output section 1107 comprising a cathode ray tube (CRT), a liquid crystal display (LCD), a speaker and the like; a storage section 1108 comprising a hard disk and the like; and a communication section 1109 comprising a network interface card such as a LAN card, a modem and the like. The communication section 1109 performs communications via a network such as the Internet. A driver 1111 is also connected to the I/O interface 1105 as needed. A removable medium 1111, such as a magnetic disk, an optical disk, a magneto-optical disk, a semiconductor memory, etc., is installed on the driver 1111 as needed, so that a computer program read therefrom may be installed in the storage section 1108 as needed.

It is noted that the architecture shown in FIG. 11 is only an optional implementation. In practice, the number and types of components in FIG. 11 may be selected, deleted, added or replaced according to actual needs. Different components may be configured separately or integrally, for example, GPU and CPU may be arranged separately or GPU may be integrated on CPU, communication components may be arranged separately or integrated on CPU or GPU, and so on. These alternative embodiments all fall within the protection scope of this disclosure.

For example, according to the embodiment of the disclosure, the process described above with reference to the flowchart may be implemented as a computer software program. For example, an embodiment of the disclosure comprises a computer program product, which comprises a computer program tangibly embodied on a machine-readable medium, the computer program comprises program codes for executing the method shown in the flowchart, and the program code may comprise instructions correspondingly executing the steps in the method for blockchain access authority control based on privacy protection in the embodiment of the disclosure.

The disclosure is described with reference to flowcharts and/or block diagrams of methods, apparatuses (systems), and computer program products according to the embodiments of the disclosure. It is understood that each flow and/or block in the flowchart and/or block diagram, and combinations of flows and/or blocks in the flowchart and/or block diagram may be implemented by computer program instructions. These computer program instructions may be provided to a processor of a general-purpose computer, a dedicated purpose computer, an embedded processor, or other programmable data processing apparatus to produce a machine, such that the instructions executed by the processor of the computer or other programmable data processing apparatus produce a device for implementing the operations in one or more flows in the flowcharts and/or one or more blocks in the block diagrams.

These computer program instructions may also be stored in a computer-readable memory which may direct a computer or other programmable data processing apparatus to function in a particular manner, such that the instructions stored in the computer-readable memory produce an article of manufacture including an instruction device which implements the operations in one or more flows in the flowcharts and/or one or more blocks in the block diagrams.

These computer program instructions may also be loaded onto a computer or other programmable data processing apparatus such that a series of operational steps are performed on the computer or other programmable apparatus to produce a computer implemented process, such that the instructions executed on the computer or other programmable apparatus provide steps for implementing the operations in one or more flows in the flowcharts/or one or more blocks in the block diagrams.

All the embodiments in this specification are described in a progressive way, and each embodiment focuses on the differences from other embodiments. The same and similar parts among the embodiments may be referred to one another. As the above system embodiments are basically similar to the method embodiments, the description is relatively simple, and refer to the description of the method embodiments for relevant information.

The method and apparatus of the disclosure may be implemented in many ways. For example, the method and apparatus of the disclosure may be implemented by software, hardware, firmware or any combination thereof. The above order of steps in the method is only for illustration, and the steps of the method of the disclosure are not limited to the order specifically described above, unless otherwise specified. Further, in some embodiments, the disclosure may also be implemented as programs recorded in a recording medium, which include machine-readable instructions for implementing the method according to the disclosure. Thus, the disclosure also covers a recording medium storing programs for executing the method according to the disclosure.

Although the preferred embodiments of the disclosure have been described, those skilled in the art may make additional changes and modifications to these embodiments once they know the basic inventive concepts. Therefore, the appended claims are intended to be interpreted as including the preferred embodiment and all changes and modifications that fall within the scope of the disclosure.

Obviously, those skilled in the art may make various changes and modifications to the disclosure without departing from the spirit and scope of the disclosure. Thus, the disclosure is also intended to comprise such modifications and variations if they fall within the scope of the claims of the disclosure and their equivalents.

What is claimed is:

1. A method for blockchain access authority control based on privacy protection, which is applied to a blockchain system, wherein the blockchain system comprises a plurality of blockchain nodes, and for each blockchain node of the plurality of blockchain nodes, a distributed node corresponding to the blockchain node is also deployed on a node device where the blockchain node is located, distributed nodes corresponding respectively to the plurality of blockchain nodes form a distributed storage system, and the method comprises:

receiving, by a second blockchain node, a data storage transaction, a first ciphertext and a second ciphertext sent by a second client, the first ciphertext being obtained by encrypting a content to be stored with a first encryption key of the second client, the second ciphertext being obtained by encrypting a first decryption key with a private key of the second client, the second blockchain node being any blockchain node in the blockchain system, and the first decryption key and the first encryption key being same symmetric keys or mutually asymmetric keys;

verifying, by the second blockchain node, the data storage transaction;

determining, by the second blockchain node, a first storage node from the distributed storage system in a case where the data storage transaction passes verification, the first storage node being a distributed node storing the first ciphertext;

determining, by the second blockchain node, a content identifier corresponding to the first ciphertext, writing the first ciphertext and the content identifier into the first storage node, and writing the data storage transaction into a local blockchain of the second blockchain node;

receiving, by a first blockchain node, an access request sent by a first client, the access request comprising instruction information of an access content, and role confirmation information and authority authentication information of the first client, and the first blockchain node being any blockchain node in the blockchain system;

determining, by the first blockchain node, a distributed node where the access content is located from the distributed storage system based on indication information, after determining a possession of a first authority to access the blockchain system by the first client according to the role confirmation information; and obtaining, by the first blockchain node, the access content from the distributed node where the access content is located and returning the access content to the first client, after determining a possession of a second authority to access the distributed node where the access content is located by the first client according to the authority authentication information.

2. The method of claim 1, wherein each blockchain node in the blockchain system stores a distributed ledger comprising a plurality of content identifiers and corresponding relationships between each content identifier in the plurality of content identifiers and at least one distributed node identifier, and a content indicated by each content identifier is stored on a distributed node indicated by at least one distributed node identifier corresponding to the content identifier.

3. The method of claim 1, wherein after writing the first ciphertext and the content identifier into the first storage node, the method further comprises:

generating, by the second blockchain node, routing information of the first ciphertext, the routing information comprising a content identifier of the first ciphertext, and a node identifier, an IP address and a UDP port of the first storage node; and adding the routing information of the first ciphertext to a routing table.

4. The method of claim 1, wherein the data storage transaction comprises a service information field, and before writing the data storage transaction into a local blockchain of the second blockchain node, the method further comprises:

setting the service information field as a uniform resource locator URL address of the content to be stored in the local storage system in a case where the content to be stored is stored in a local storage system; and setting the service information field as a content identifier of the content to be stored in a case where the content to be stored is stored in the distributed storage system.

5. The method of claim 4, wherein the data storage transaction comprises an access policy field, and before writing the data storage transaction into a local blockchain of the second blockchain node, the method further comprises:

decrypting the second ciphertext with a public key of the second client to obtain the first decryption key, in a case where the content to be stored is stored in the distributed storage system and the content to be stored is private data;

for each accessible object of the content to be stored, encrypting, by the second blockchain node, the first decryption key into a third ciphertext with a public key of the accessible object, and storing a corresponding relationship between a user identifier of the accessible object and the third ciphertext of the accessible object; and obtaining, by the second blockchain node, a first storage address, and setting the first storage address in the access policy field of the data storage transaction, the first storage address being a storage address of the corresponding relationship.

6. The method of claim 5, wherein before writing the data storage transaction into a local blockchain of the second blockchain node, the method further comprises:

determining, by the second blockchain node, a privacy level of the privacy data, and obtaining a second storage address based on the privacy level, the second storage address being a storage address of an authority verification rule corresponding to the privacy level; and setting, by the second blockchain node, the second storage address in the access policy field of the data storage transaction.

7. The method of claim 6, wherein the indication information of the access content comprises metadata of the access content or a transaction ID of a data storage transaction corresponding to the access content; and wherein the determining a distributed node where the access content is located from the distributed storage system based on the indication information comprises:

querying a target transaction from a blockchain according to the indication information, the target transaction being a data storage transaction comprising the indication information;

querying target routing information from the routing table based on the content identifier in a case where service information in the target transaction is a content identifier, the target routing information being routing information comprising the content identifier; and determining a distributed node represented by the node identifier, IP address and UDP port number in the target routing information as the distributed node where the access content is located.

8. The method of claim 7, wherein the distributed node where the access content is located is a second storage node; and wherein the determining, by the first blockchain node, a possession of a second authority to access the distributed node where the access content is located by the first client according to the authority authentication information comprises:

sending, by the first blockchain node, a query request to the second storage node based on the target routing information, the query request carrying a transaction ID of the target transaction;

determining, by the second storage node when receiving the query request, the target transaction based on the transaction ID in the query request, and obtaining a value of an access policy field in the target transaction to obtain at least one storage address;

querying the corresponding third ciphertext from the first storage address based on the user identifier of the first client in a case where the at least one storage address includes only the first storage address; and determining that the first client has the second authority to access the distributed node where the access content is located, in a case where the third ciphertext corresponding to the user identifier of the first client is queried upon.

9. The method of claim 8, wherein the determining, by the first blockchain node, a possession of a second authority to access the distributed node where the access content is located by the first client according to the authority authentication information further comprises:

querying the corresponding third ciphertext from the first storage address based on the user identifier of the first client in a case where the at least one storage address includes the first storage address and the second storage address;

obtaining the authority verification rule from the second storage address in a case where the third ciphertext corresponding to the user identifier of the first client is queried upon; and determining that the first client has the second authority to access the distributed node where the access content is located, in a case where it is determined that the first client passes verification based on the authority verification rule.

10. The method of claim 9, wherein the blockchain system is a first blockchain system, the first blockchain system communicates with a second blockchain system, and the first blockchain system comprises a plurality of notary nodes which are blockchain nodes belonging to both the first blockchain system and the second blockchain system; at least one blockchain node in the blockchain system is deployed with a first smart contract, the first smart contract communicates with a daemon of a distributed node in the node apparatus where the blockchain node carrying the first smart contract is located, the first smart contract is configured to receive running data sent by the daemons and to send the running data to the plurality of notary nodes, and the plurality of notary nodes reach a consensus and then store the running data in the second blockchain system.

11. The method of claim 10, wherein the determining that the first client passes verification based on the authority verification rule comprises:

querying, by the first blockchain node, the running data of the distributed node where the access content is located within a preset time period from the second blockchain system;

calculating the error report frequency and/or query failure frequency of the distributed node where the access content is located within the preset time period, according to the running data of the distributed node where the access content is located within the preset time period;

determining a confidence of the distributed node where the access content is located, based on the error report frequency and/or query failure frequency;

determining a corresponding first security level according to the confidence of the distributed node where the access content is located;

determining a second security level of the access object according to a historical access log of the first client;

detecting whether the authority authentication information comprises reading operation information, in a case where the second security level is greater than or equal to the first security level; and determining that the access object has the second authority to access the distributed node where the access content is located, in a case where the authority authentication information comprises the reading operation information.

12. The method of claim 8, wherein the obtaining the access content from the distributed node where the access content is located and returning the access content to the first client comprises:

obtaining the first ciphertext from the second storage node based on the indication information; and returning the first ciphertext and the second ciphertext to the first client, to enable the first client to decrypt the second ciphertext to obtain the first decryption key, and to decrypt the first ciphertext into the access content with the first decryption key.

13. A non-transitory computer-readable storage medium storing computer-readable instructions, wherein the instructions, when being executed, implement the method for blockchain access authority control based on privacy protection of claim 1.

* * * * *